United States Patent

[11] 3,568,572

| [72] | Inventor | Charles P. Steinmetz<br>Palo Alto, Calif. |
|---|---|---|
| [21] | Appl. No. | 808,576 |
| [22] | Filed | Mar. 19, 1969 |
| [45] | Patented | Mar. 9, 1971 |
| [73] | Assignee | The United States of America as represented by the Administrator of the National Aeronautics and Space Administration |

[54] ENERGY LIMITER FOR HYDRAULIC ACTUATORS
4 Claims, 1 Drawing Fig.

[52] U.S. Cl............................................. 91/361,
91/390, 91/448, 60/51
[51] Int. Cl........................................F15b 13/044,
F15b 13/16
[50] Field of Search........................................... 91/390, 31,
54 (SP), 361; 60/(Inquired), 51 (Cursory), 545
(HA)

[56] References Cited
UNITED STATES PATENTS

| 2,853,974 | 9/1958 | Hewitt.......................... | 91/31 |
| 3,033,174 | 5/1962 | Hemstreet.................... | 91/390 |
| 3,385,169 | 5/1968 | Hale et al..................... | 91/390 |

*Primary Examiner* — Paul E. Maslousky
*Attorneys* — Darrell G. Brekke and G. T. McCoy ABSTRACT: The speed imparted to a movable member being hydraulically returned to a null or neutral position is controlled by limiting fluid flow in the hydraulic system by providing at least two parallel fluid flow paths in series with a source of fluid pressure and the hydraulic means that returns the movable member to its null or neutral position. One such parallel fluid flow path provides a constant impedance to fluid flow and another parallel fluid flow path will temporarily provide an additional fluid flow of a low impedance response to fluid pressure exceeding a predetermined level.

Patented March 9, 1971
3,568,572
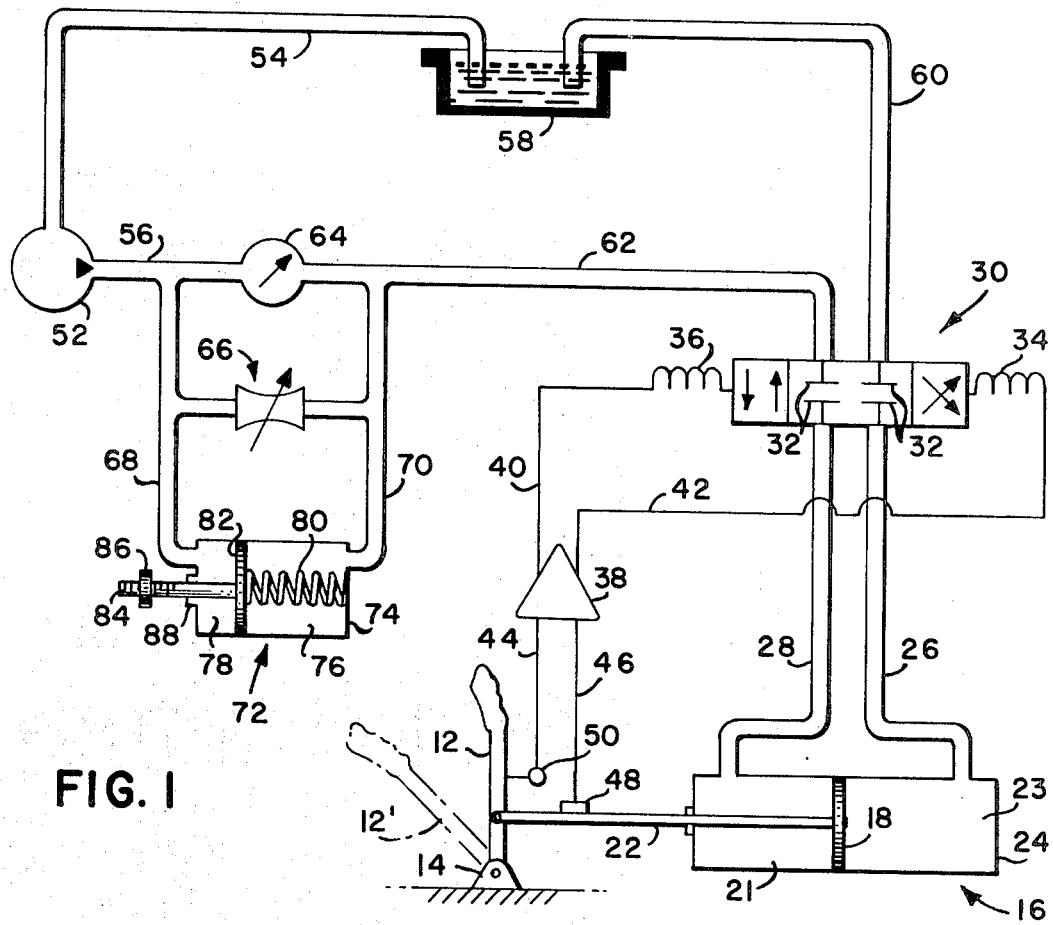
FIG. 1
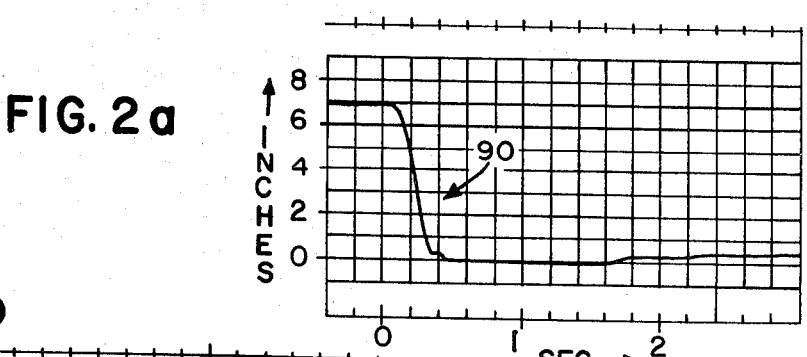
FIG. 2a
FIG. 2b
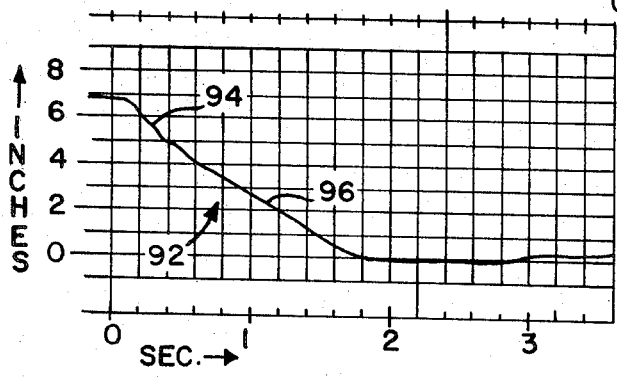
*INVENTOR.*
CHARLES P. STEINMETZ
BY
ATTORNEYS

ENERGY LIMITER FOR HYDRAULIC ACTUATORS

The invention described herein was made by an employee of the United States Government and may be manufactured and used by or for the Government for Governmental purposes without the payment of any royalties thereon or therefor.

BACKGROUND OF THE INVENTION

This invention relates to energy limiters for hydraulic actuators and more particularly to controlling the speed of hydraulically movable members being returned to a predetermined position by a hydraulic servo loop.

Hydraulic systems are often used to move mechanical linkages. High speed movement of such mechanical members, as a result of an erroneous or inadvertant step function or signal applied to the hydraulic system, creates a serious danger to personnel in the vicinity of the mechanical member being hydraulically moved. Such hydraulic systems are sometimes used in aircraft simulators to realistically simulate the feel and force needed to manually actuate various aircraft controls and/or to return such controls to a null or normal position. For example, some aircraft simulators utilize a hydraulic servo loop to return the control column to its normal position. An inadvertant step function applied to such a hydraulic servo loop, due to a malfunction in the servo loop or some other cause, imparts high speed movement to the control column which can easily result in serious injury to an operating student pilot. Any means used to prevent such high speed movement preferably must not destroy the realistic feel that the control column, or wheel, presents to the student pilot since one of the primary uses of flight simulators is to train and instruct student pilots in actual flight conditions.

SUMMARY OF THE INVENTION

A primary object of this invention is to provide means for limiting the speed of hydraulically movable mechanical members by limiting the hydraulic energy applied to hydraulic actuators. Another object of this invention is to control the speed imparted to movable members by a hydraulic servo loop. Other objects of this invention are to control the speed at which a simulated aircraft control column is returned to its null position by a hydraulic servo loop, and to return the control column to this position without destroying the realistic simulated feel imparted to the operator by the control column.

Briefly described, these and other objects of this invention are accomplished by a movable member coupled to and movable by a hydraulic actuator. Speed controlling means coupled between a source of fluid pressure and the actuator includes a first fluid flow path having a constant impedance to fluid flow and a second fluid flow path in parallel with the first path and adapted to present a temporary impedance to fluid flow which is much lower than said constant impedance. The first path may include a linear flow rate valve and the second path a hollow member for storing a quantity of fluid having a resiliently mounted piston therein. More specifically, the hydraulic actuator and movable member may be coupled to a hydraulic servo valve to form a closed hydraulic servo loop with fluid flow to the servo valve being limited by the first and second fluid flow paths.

BRIEF DESCRIPTION OF THE DRAWINGS

These and others other features, objects and advantages of the present invention will become apparent from consideration of the following detailed description taken in conjunction with the annexed drawings in which:

FIG. 1 is a schematic illustration of hydraulic speed control means in accordance with the present invention and incorporated into a hydraulic system for controlling the control column of a simulated aircraft;

FIG. 2a is a graph which shows the distance versus time characteristic of the hydraulic actuator of FIG. 1 without the speed control means of this invention; and FIG. 2b is a graph which shows the distance versus time characteristic of the hydraulic actuator of FIG. 1 with the speed control means of this invention.

DESCRIPTION OF THE PREFERRED EMBODIMENT

A hydraulic system that may impart motion to a movable mechanical member is illustrated in FIG. 1 which shows a closed hydraulic system having a servo loop for returning a control column 12 of a flight simulator to its null or neutral position. The control column 12 is movably mounted at one end thereof to a support 14. A hydraulic actuator 16 including a fluid container, such as a cylindrical housing 24, is divided into two sections 21 and 23 by a piston 18. A rigid rod 22 is movably mounted at the left end of the cylindrical housing 24 with one end of the rod being coupled to the control column 12 and the other end of the rod being connected to the piston 18. Hydraulic line 28 is coupled to the section 21 on the left side of the piston 18 and hydraulic line 26 is coupled to the section 23 on the right side of the piston 18 contained within the cylindrical housing 24. Fluid flow into section 21 from hydraulic line 28 causes the piston 18 to move to the right which results in fluid flow out of section 23 into the hydraulic line 26, and, since the piston 18 and control column 12 are connected by the rod 22, clockwise movement of the control column 12. Conversely, fluid flow into section 23 of the hydraulic actuator 16 from the hydraulic line 26 forced the piston 18 to the left which results in fluid flow out of section 21 into hydraulic line 28, and counterclockwise movement of the control column 12 around the support 14.

Hydraulic lines 26 and 28 are coupled to a hydraulic servocontrol valve 30. Fluid flow to the servo valve 30 is provided by the hydraulic line 62 and fluid flow from the servo valve is provided by the hydraulic line 60. The servo valve 30 includes a plurality of fluid flow control elements or valves illustrated by the reference characters 32. The position of these elements 32 are controlled by solenoids schematically illustrated by the reference characters 34 and 36. The control elements 32 determine the direction of fluid flow through the hydraulic actuator 16, that is, into section 21 and out of section 23 to urge the control column 12 clockwise or into section 23 and out of section 21 to urge the control column counterclockwise. However, fluid flow to and from the servo valve 30 is always by way of the hydraulic lines 62 and 60 respectively. The position of the elements 32, as determined by the solenoids 34 and 36, also determine the rate of fluid flow through the servo valve 30 and, therefore, through the actuator 16 to determine the speed and/or pressure imparted to the control column 12.

The hydraulic line 60 is coupled to a fluid reservoir 58 which in turn is coupled to a hydraulic pump 52 by way of the hydraulic line 54. The pump 52 is coupled to the hydraulic line 62 by way of the hydraulic line 56 and a shutoff valve 64 having an opened and closed position.

Transducers, such as a force sensor 48 and a position sensor 50, coupled to the control column 12 produce electrical signals indicative of the position of the column 12 on leads 46 and 44 respectively. These signals are amplified by a servoamplifier 38 and applied to the solenoids 34 and 36 of the servo valve 30 by way of the leads 42 and 40 respectively. These signals cause the position of the control elements 32 of the servo valve 30, as determined by the servo solenoids, to be related to the position of the control column 12 in a manner well known in the art. As will be apparent to those skilled in the art, the servo valve 30, hydraulic actuator 16, servoamplifier 38 and related components comprise a closed hydraulic servo loop.

Assume now that the shutoff valve 64 is open so that all fluid flow between the pump 52 and the servo valve 30 passes through the shutoff valve 64. For this condition there is no fluid flow through a needle valve 66 or modified accumulator 72 which are in parallel with one another and in parallel with the shutoff valve 64. These elements 66 and 72 will be described hereinbelow in detail. The operation of the system shown in FIG. 1 is such that when the control column 12 is upright as shown, it is in its null or neutral position. For this position, the output of the servoamplifier, due to its input provided by the sensors 48 and 50, causes the control elements 32 to be positioned such that no fluid flow takes place between the servo valve 30 and the hydraulic actuator 16. Accordingly, the piston 18 exerts no pressure on the control column 12. Under these conditions, no fluid flow takes place in the closed hydraulic system.

Assume now that a student pilot now begins to move the control column counterclockwise to the position indicated by the dotted outline 12'. As the control column 12 is moved from its null position, its new position is continuously monitored by the sensors 48 and 50 which provide the appropriate and corresponding electrical signals to the servoamplifier 38. The output signals from the amplifier now cause the solenoids 34 and 36 to position the control elements 32 such that a portion of the fluid pressure at the servo valve 30 is exerted on the left side of the piston 18 by way of the line 28 and section 21 of the hydraulic actuator 16. As the control column is moved further from its null position, the output of the amplifier 38 causes the control elements 32 of the servo valve to be positioned such that an increasing amount of fluid pressure is applied to the left side of the piston 18. It is clear now that moving the control column away from its null position causes an increasing fluid pressure on the left side of the piston 18. This pressure is directly proportional to the distance the control column is away from its null position and must be overcome by the student pilot to further move the column 12 from its null position. This pressure exerted on the control column 12 by the piston 18 of the actuator 16 is imparted to the student pilot and realistically simulates the feel of an actual control column of an aircraft in flight. When the student pilot releases his pressure on the column 12, or reduces it to a level below that existing on the left side of the piston 18, the piston is moved to the right. This causes fluid flow from the servo valve 30 into the hydraulic line 28 and section 21 of the actuator 16 and out of section 23 of the actuator 16, into the hydraulic line 26 and through the servo valve 30 to the hydraulic line 60. This also causes the control column 12 to be moved back toward its null position due to the coupling between it and the piston 18 by means of the rod 22. In a manner as described above, but in reverse, movement of the control column 12 back to its null position enables the servoamplifier to proportionately position the control elements 32 such that the fluid pressure on the left side of the piston 18 is correspondingly reduced, reducing the fluid flow through the actuator 16. When the control column is thus returned to its null position, fluid pressure on the piston 18 is zero due to the position of the control elements 32 as determined by the output of the amplifier 38 and there is no fluid flow through the actuator 16.

If, as a result of a servoamplifier 38 breakdown, an overload in the electrical control system which may be caused by turning the system on or off, or some other cause; a large scale step function or a hard-over signal is applied to the servo valve 30 solenoids; the control elements 32 rapidly become positioned so that maximum fluid pressure is applied to one side of the piston 18. This results in high speed movement of the piston 18 and a corresponding high speed movement is imparted to the control column 12. The curve 90 of FIG. 2a, which is a graph of distance versus time, shows that a large scale step function applied to the servo valve 30 causes the piston 18 to travel a distance of about 7 inches in two-tenths of a second. As will be apparent from FIG. 1, this causes the end of the control column remote from the support 14 to travel a much farther distance in the same period of time. Such speeds imparted to the control column can easily cause serious injury to any personnel located in the path of the control column 12. Such speeds have resulted in injury to the legs, hands, and other areas of the body of operating personnel.

Such speeds are prevented by the present invention without impairing the response of the system by a linear fluid flow rate device, such as a needle valve 66, in parallel with the shutoff valve 64, as shown in FIG. 1. Also in parallel with the needle valve 66 and the shutoff valve 64 is a modified accumulator 72. When the shutoff valve 64 is closed, fluid flow between the pump 52 and servo valve 30 is by way of the hydraulic lines 56, 68, the needle valve 66 and/or the modified accumulator 72, and the hydraulic lines 70 and 62. As is described below in detail, this fluid flow path results in limiting, or controlling, the speed imparted to the control column 12 by the actuator 16 even when large scale step functions or hard-over signals are applied to the system. The modified accumulator 72 includes a hollow cylindrical body 74 which has a piston 82 mounted therein which divides the accumulator into two sections 76 and 78. The piston 82 is resiliently biased within the cylinder 74 by a spring 80. Attached to the side of the piston 82 remote from the spring 80 is a threaded rod 84 which movably extends out of the adjacent end of the cylinder 74. A stop nut 86 is secured to the portion of the rod 84 which extends outside of the cylinder 74. A piston stop 88 is attached to one end of the cylinder 74 and surrounds the rod 84 where it emerges from one end of the cylinder 74.

Unlike the needle valve 66 which presents a constant impedance to fluid flow, the modified accumulator presents a very high or substantially infinite impedance to fluid pressure on the left side of the piston 82 that is insufficient to overcome the force of the spring 80 holding the piston 82 in place when valve 30 is closed. When valve 30 is opened, fluid pressure on the left side of the piston 82 is high enough to overcome the retaining force of the spring and causes the piston to be moved to the right until the stop nut 86 engages the piston stop 88. When the piston is so moved, the modified accumulator 72 presents a very low impedance to fluid flow until the nut 86 reaches the stop 88 at which time the accumulator 72 again presents a very high impedance to fluid flow. When forced to the right, the piston 82 provides less resistance to fluid flow than the needle valve 66 and enables a quantity of full performance fluid flow to take place. This full system performance is limited by the position of the stop nut 86 on the threaded rod 84 and the diameter of the cylinder 74 and piston 82.

Assume now that the shutoff valve 64 is closed placing the needle valve 66 and modified accumulator 72 into the closed hydraulic system; input commands to the control column 12 by a student pilot causes the column 12 to be moved from its null position and results in the actuator 16 applying a restraining force to column 12 which is proportional to the distance the column 12 is from its null position to simulate the feel of an actual control column of an aircraft in flight, in a manner as described above. When the column 12 is free to return to its null position, fluid will flow through the servo valve 30 and actuator 16 to cause the piston 18 to return the control column 12 to its null position, in a manner as described above. However, all fluid flow must now pass through the constant impedance needle valve 66 and/or the modified accumulator 72. The needle valve 66 can be adjusted to provide sufficient fluid flow for all moderate demands made upon the hydraulic system. The constant impedance of this valve 66 limits the fluid flow at a linear rate thereby limiting the energy applied to the actuator 16 and the resultant speed imparted to the control column 12.

For moderate demands, the needle valve 66 presents the best resistant to fluid flow and, therefore, all fluid flow is therethrough. However, when large demands are made on the system, such as when a large scale step function or hard-over signal is applied to the servo valve 30, the pressure on the left side of the accumulator 72 piston 82 overcomes the force of the spring 80. In the event of a greater than normal flow rate demand, the nut 86 strikes the stop 88. At this point any further motion of the actuator 16 piston 18 must be supplied by fluid flow through the needle valve 66. As will now be clear, maximum speed is imparted to the control column 12 only during the time the modified accumulator 72 is actuated.

The amount of this full system performance is controlled, as stated above, by the location of the stop nut 86 and the size of the accumulator 72. The fluid pressure at which the modified accumulator 72 is actuated is determined by the strength of the spring 80. Also, since the piston 82 presents some impedance to fluid even when it is being moved against the force of the spring 80, the speed imparted to the column 12 by actuation of the accumulator 72 is less than when the shutoff valve is open and all fluid flows therethrough. When the greater than normal flow rate is no longer required, the accumulator 72 piston 82 is returned to its ready position by the spring 80.

The speed limiting function of the needle valve 66 and the accumulator 72 can be seen by FIG. 2b, which illustrates a distance versus time curve 92 for the actuator 16 piston 18 in response to a large scale step function applied to the servo valve 30 with the needle valve 66 and modified accumulator 72 in the hydraulic system and the shutoff valve 64 closed. The curve 92 shows that maximum speed is imparted to the actuator 16 piston 18 at the initial portion of the excursion when the modified accumulator 72 piston 82 is being moved to the right as shown by that part of the curve 92 indicated by the reference character 94. Thereafter, the speed of the actuator 16 piston 18 is rate limited in a linear manner by the needle valve 66 as shown by that part of the curve 92 indicated by the reference character 96. The speed limiting function of this invention is particularly clear when comparing FIGS. 2a and 2b. A distance of about 7 inches was covered in a time of about 1 7/10 seconds with the present invention as shown by FIG. 2b whereas the same distance was covered in a time of about two-tenths of a second without the present invention as shown by FIG. 2a.

Also, FIG. 2b shows that the modified accumulator 72 controlled the speed imparted to the control column 12 at the initial part of the excursion and for only 10—20 percent of the total excursion. Since in all but catastrophic aircraft flight maneuvers high velocity motion of the control column is restricted to the initial portion of the excursion (the first 10-—20 percent); the curve of FIG. 2b imparts realistic aircraft flight pressures to the control column of a simulated aircraft without imparting speeds to the control column that can cause injury to personnel. It has been found that the reduction in full system performance produced by this invention in the case of aircraft simulator control actuators goes unnoticed in all but the most demanding situations. If desired, the apparatus of this invention can readily be removed from the hydraulic system by opening the shutoff valve 64.

Besides barely impairing the response of a hydraulic servo simulation system, the present invention is simple, economical and uses substantially only off the shelf items. The accumulator 72 is modified slightly by adding a stop pin and a return spring. The speed control of this invention also prevents undue wear on the actuator 16 and attached equipment.

It is to be understood that the present invention is not limited to a simulated aircraft control column hydraulic system for it can be used in other hydraulic systems for controlling the speed hydraulically imparted to movable members. Also, various changes and modifications can be made without departing from the spirit and scope of this invention. Accordingly, this invention is to be limited only as recited in the following claims.

I claim:
1. Apparatus comprising:
 a movable member;
 means coupled to said member for hydraulically actuating it;
 a source of fluid pressure;
 a valve coupled between said actuating means and said source, said member being quiescent when said valve is closed; and
 means coupled between said pressure source and said valve for controlling the speed imparted to said member by said actuating means when said valve is open including:
  first and second parallel fluid paths, when said valve is opened, said first path offering a constant impedance to fluid flow and said second path temporarily offering an impedance substantially less than said constant impedance and then an impedance substantially greater than said constant impedance.

2. Apparatus in accordance with claim 1 wherein said first fluid path includes a linear flow rate valve and said second fluid path includes:
 a chamber having a fluid inlet and a fluid outlet;
 a piston resiliently mounted within said chamber; and
 a stop to limit the travel of said piston within said chamber.

3. A speed control apparatus for hydraulically actuated members comprising:
 a source of fluid pressure;
 a movable member;
 means coupled to said member for hydraulically actuating said member;
 an electrically-controlled fluid valve coupled between said actuating means and said pressure source;
 transducer means attached to said movable member for generating corrective electrical signals whenever said movable member is not in a predetermined null position;
 means for coupling said signals to said valve, said signals causing said valve to energize said actuating means and move said member back to said null position; and
 means coupled between said pressure source and said valve for controlling the speed imparted to said member by said actuating means and including:
  first and second parallel fluid paths, when said actuating means is energized, said first path offering a constant impedance to fluid flow and said second path temporarily offering an impedance substantially less than said constant impedance followed by an impedance substantially greater than said constant impedance.

4. Apparatus in accordance with claim 3 wherein said first fluid path includes a linear flow rate valve and said second fluid path includes:
 a chamber having a fluid inlet and a fluid outlet;
 a piston resiliently mounted within said chamber; and
 a stop to limit the travel of said piston within said chamber.